(No Model.)                                         2 Sheets—Sheet 1.
G. S. KARR.
SADDLE FOR VELOCIPEDES.

No. 506,510.                          Patented Oct. 10, 1893.

Witnesses,
C. L. Lawrie.
E. W. McIntyre.

Inventor,
George S Karr
by Charles H Richey
his attorney (No Model.) 2 Sheets—Sheet 2.
G. S. KARR.
SADDLE FOR VELOCIPEDES.

No. 506,510. Patented Oct. 10, 1893.

Witnesses,
C. L. Lawrie.
E. W. McIntyre.

Inventor,
Geo. S. Karr
by Charles H. Riches
his Atty

UNITED STATES PATENT OFFICE.

GEORGE S. KARR, OF TORONTO, CANADA.

SADDLE FOR VELOCIPEDES.

SPECIFICATION forming part of Letters Patent No. 506,510, dated October 10, 1893.

Application filed September 19, 1892. Serial No. 446,325. (No model.)

*To all whom it may concern:*

Be it known that I, GEORGE S. KARR, of the city of Toronto, in the county of York and Province of Ontario, Canada, have invented certain new and useful Improvements in Saddles for Velocipedes; and I hereby declare the following to be a full, clear, and exact description of the same.

The object of this invention is to construct a saddle for a velocipede which will readily adapt itself to the crotch of the rider's legs and will provide a firm, comfortable, and convenient seat for the rider; and the invention consists essentially of an air tight flexible receptacle shaped to fit the crotch of the legs of the rider and provided with an air tight valve to which may be connected when necessary an air pump for inflation purposes and a saddle frame, to support the air tight receptacle which comprises a curved bar of metal between the horns of which is suspended the air tight receptacle and which has sufficient rigidity to sustain the weight of the rider; the whole device being constructed and arranged as hereinafter more fully set forth and more particularly pointed out in the claims.

Figure 1:
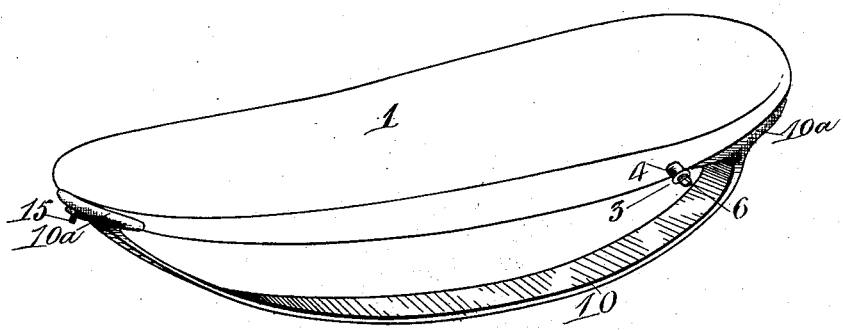
Figure 2:
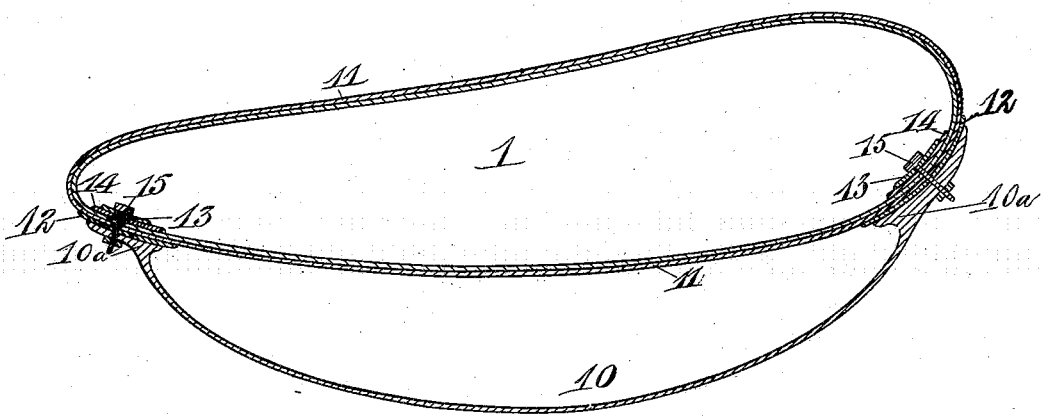
Figure 3:
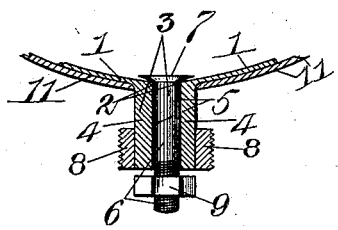
Figure 4:
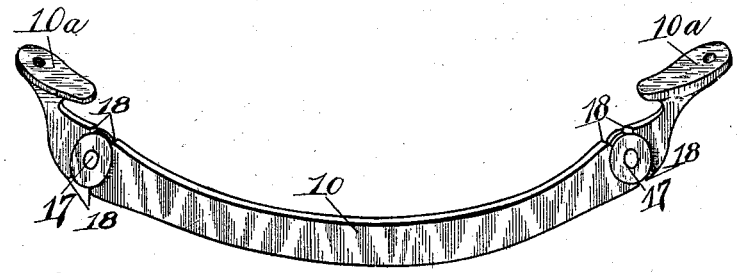

In the drawings,—Figure 1 is a perspective view of my improved saddle. Fig. 2 is a cross sectional view on the lines *a—a* of the device shown in Fig. 1. Fig. 3 is a cross sectional view of the valve. Fig. 4 is a perspective view showing the hinged frame.

Like numerals of reference refer to like parts throughout the specification and drawings.

The saddle consists of an air tight receptacle 1, and shown in the drawings to be in the form of a pear which is found to be the most convenient shape to adapt itself to the crotch of the rider, but I may if I so desire it employ any other convenient form of receptacle. This receptacle is preferably composed of rubber or other air tight material and made of two pieces connected together and without openings except the opening 2 which is closed by the air valve 3. The air valve 3 consists of a rubber tube 4 forming part of the receptacle 1, through the passage 5 of which passes the valve stem 6 of the valve 7. Connected to the outer end of the rubber tube 4 is a collar 8 screw threaded on its outer face to receive the screw threaded connecting collar of the air pump. The valve stem 6 passes entirely through the rubber tube 4 and collar 8. Fitted to the screw threaded portion of the outer end of the valve stem 6 is a lock nut 9. The saddle frame 10 consists of a curved bar of metal of sufficient rigidity to sustain the weight of the rider when upon the saddle. Each horn 10ª of the saddle 10 is an enlarged plate which serves as a seat for the receptacle 1 and each is curved to follow the curvature of the said air receptacle when inflated.

It might here be stated that the air receptacle 1 is inclosed in an outer covering 11 preferably made of leather, canvas, or other suitable material. Located between the outer covering 11 and the enlarged portion of the horns 10ª is a washer 12. Within the air receptacle is a metallic plate 13 and between the metallic plate 13 and the inner side of the air receptacle 1 is a washer 14. Passing through the washer 12, plate 13 and the enlarged horns 10ª is a rivet or bolt 15 which securely locks the several different mentioned parts together and holds the air receptacle 1 firmly to the saddle frame 10.

A saddle of this description can be inflated to any desired degree of firmness most convenient to the rider and when inflated will readily accommodate itself to the various movements of the rider and motion of the machine.

By reference to Fig. 4 it will be noticed that the saddle frame 10 is constructed of three sections and these sections are hinged together by means of circular hinges 17 provided with abutting shoulders 18 to arrest the movement of the said sections so that while the outer ends of the outer sections will be permitted to move in toward each other when the weight is upon the saddle they will be prevented from moving more than a predetermined distance.

Having thus fully described my invention, what I claim as new, and desire to secure by Letters Patent, is—

1. In a saddle for velocipedes the combination of a saddle frame comprised of a curved bar having two horns each of which is enlarged to form a plate, an inflatable receptacle suspended to each of said horns, a washer on the inner side of the said receptacle, rivets passing through the said washer and the enlargements of said horns to secure the said receptacle to the saddle frame, an outer covering of flexible material inclosing the inflatable receptacle, a tube extending through the flexible covering to the inflatable receptacle, a valve to close the opening through the tube to the receptacle, substantially as specified.

2. A saddle comprised of an inflatable receptacle, a valve to said receptacle comprised of a tube having a passage therethrough, a valve stem within said passage, a valve connected to said valve stem, said valve adapted to close the inner end of the said passage, a collar secured to the outer end of the tube, said valve stem passing through said collar and screw threaded at its outer end, a lock nut fitted to the outer end of the valve stem, a saddle frame comprised of a curved bar having two horns each of which is enlarged to form a plate, said receptacle suspended to each of said horns, a washer on the inner side of the said receptacle through which passes rivets securing the said receptacle to said plates, an outer covering of flexible material inclosing said receptacle, substantially as set forth.

Toronto, September 1, 1892.

G. S. KARR.

In presence of—
  W. L. M. LINDSEY,
  CHARLES H. RICHES.